United States Patent
Lee

(10) Patent No.: US 9,845,742 B2
(45) Date of Patent: Dec. 19, 2017

(54) TURBOCHARGER GENERATING VACUUM NEGATIVE PRESSURE, VACUUM NEGATIVE PRESSURE SUPPLY TYPE BRAKE SYSTEM USING THE SAME, AND CONTROL METHOD THEREOF

(71) Applicant: Hyundai Motor Company, Seoul (KR)

(72) Inventor: Chul-Hyun Lee, Hwaseong-si (KR)

(73) Assignee: Hyundai Motor Company, Seoul (KR)

(*) Notice: Subject to any disclaimer, the term of this patent is extended or adjusted under 35 U.S.C. 154(b) by 33 days.

(21) Appl. No.: 14/789,230

(22) Filed: Jul. 1, 2015

(65) Prior Publication Data

US 2016/0153448 A1    Jun. 2, 2016

(30) Foreign Application Priority Data

Dec. 1, 2014  (KR) .................... 10-2014-0169663

(51) Int. Cl.

| | |
|---|---|
| *F02C 6/12* | (2006.01) |
| *F04C 23/02* | (2006.01) |
| *F04C 25/02* | (2006.01) |
| *B60T 13/46* | (2006.01) |
| *F02D 41/00* | (2006.01) |
| *F04C 29/00* | (2006.01) |
| *F04C 18/344* | (2006.01) |
| *F02B 37/12* | (2006.01) |
| *B60T 17/02* | (2006.01) |
| *F04C 23/00* | (2006.01) |
| *F04C 28/24* | (2006.01) |

(52) U.S. Cl.
CPC .......... *F02D 41/0007* (2013.01); *B60T 13/46* (2013.01); *B60T 17/02* (2013.01); *F02B 37/12* (2013.01); *F02C 6/12* (2013.01); *F04C 18/3441* (2013.01); *F04C 23/02* (2013.01); *F04C 25/02* (2013.01); *F04C 29/0085* (2013.01); *F02D 2250/41* (2013.01); *F04C 23/005* (2013.01); *F04C 28/24* (2013.01); *Y02T 10/144* (2013.01)

(58) Field of Classification Search
CPC .......... F02C 6/12; F04C 23/005; F04C 23/02; F04C 25/02; F02D 41/0007; F02D 2250/41

See application file for complete search history.

(56) References Cited

U.S. PATENT DOCUMENTS

| | | | |
|---|---|---|---|
| 2007/0267003 A1* | 11/2007 | Sumser et al. | ....... F02B 25/06 123/572 |
| 2013/0146039 A1* | 6/2013 | Pursifull | ....... F01M 1/02 123/572 |

FOREIGN PATENT DOCUMENTS

| | | |
|---|---|---|
| JP | 3-17298 U | 2/1991 |
| JP | 2014-91409 A | 5/2014 |
| JP | 2014-145294 A | 8/2014 |
| KR | 10-2006-0003138 A | 1/2006 |

(Continued)

*Primary Examiner* — Audrey K Bradley
(74) *Attorney, Agent, or Firm* — Morgan, Lewis & Bockius LLP

(57) ABSTRACT

A turbocharger generating a vacuum negative pressure may include a compressor which receives, through a turbocharger shaft, a rotational force of a turbine which rotates based on exhaust gas from an engine and turbo-charges an intake which is supplied to the engine, and a motorless vacuum pump coupled to the turbine through a center housing which is coupled to the compressor and is configured to be rotated by the turbocharger shaft, thus generating a vacuum negative pressure.

3 Claims, 7 Drawing Sheets

(56) References Cited

FOREIGN PATENT DOCUMENTS

| KR | 10-0773900 B1 | 11/2007 |
| KR | 10-2008-0024741 A | 3/2008 |
| KR | 10-1406816 B1 | 6/2014 |

\* cited by examiner

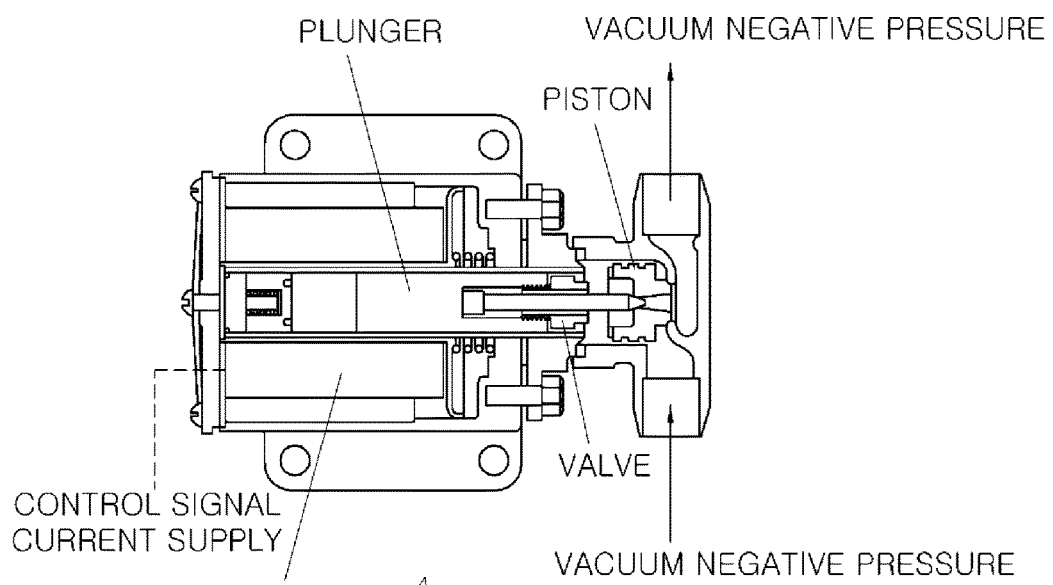
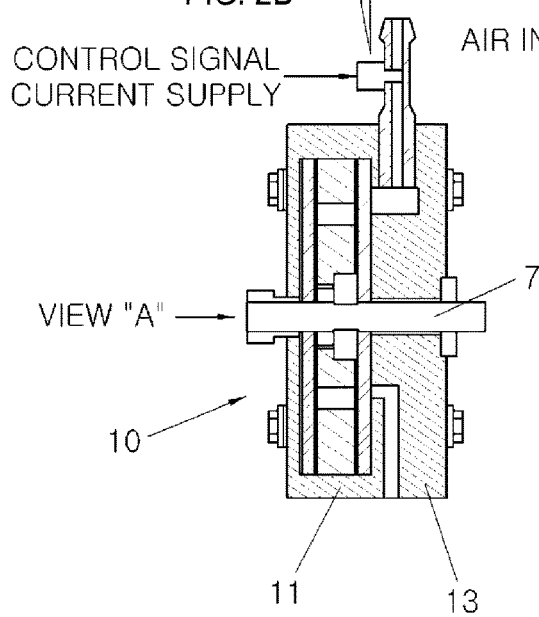
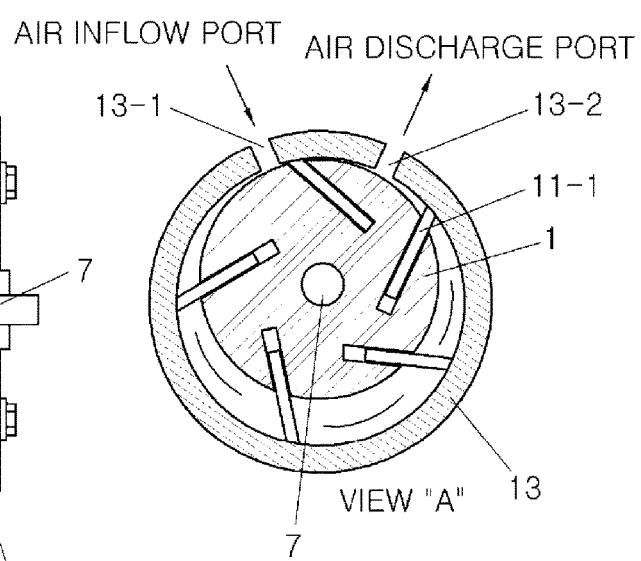

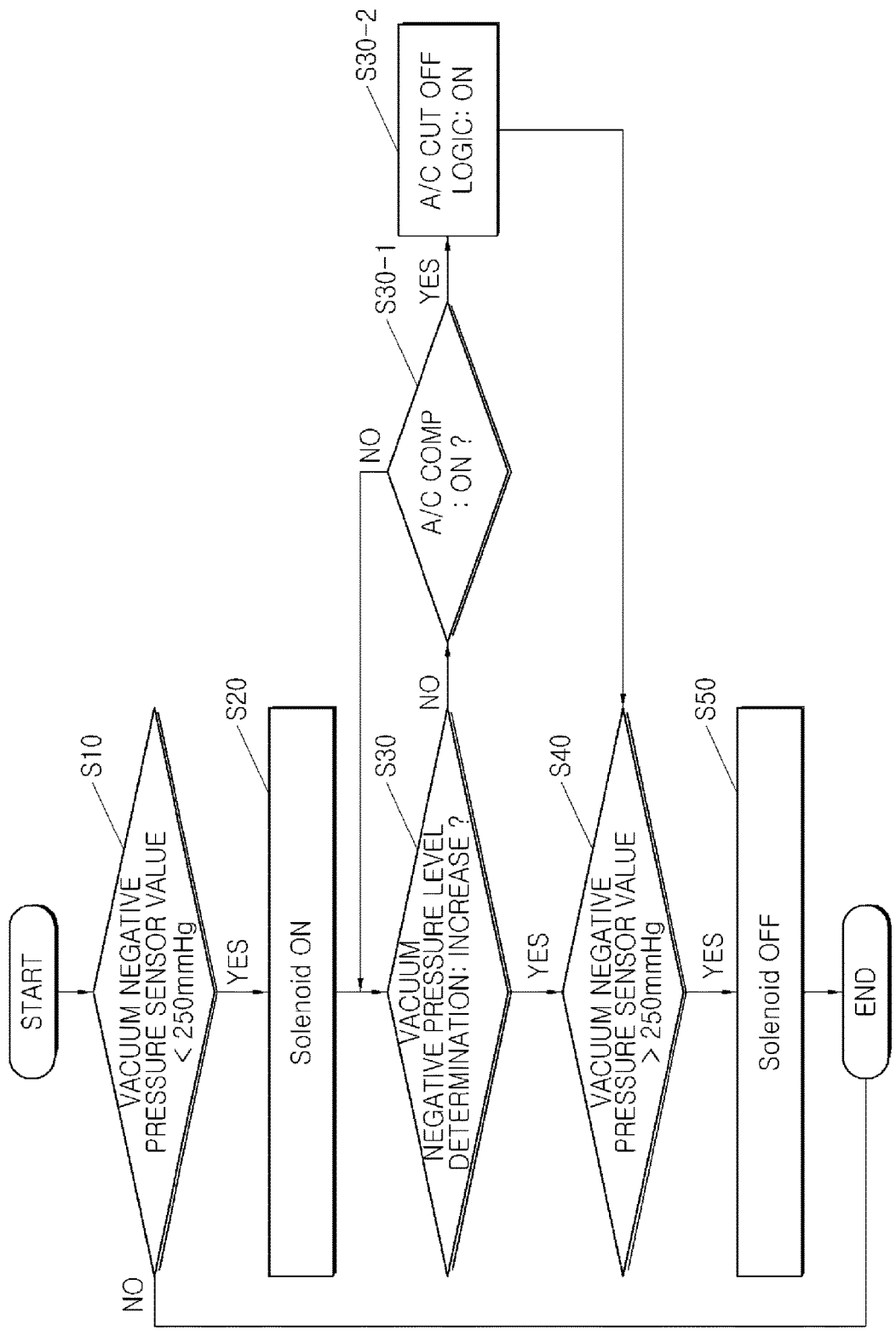

TURBOCHARGER GENERATING VACUUM NEGATIVE PRESSURE, VACUUM NEGATIVE PRESSURE SUPPLY TYPE BRAKE SYSTEM USING THE SAME, AND CONTROL METHOD THEREOF

CROSS-REFERENCE TO RELATED APPLICATIONS

The present application claims priority to Korean Patent Application No. 10-2014-0169663, filed Dec. 1, 2014, the entire contents of which is incorporated herein for all purposes by this reference.

BACKGROUND OF THE INVENTION

Field of the Invention

Various embodiments of the present invention relate to a turbocharger; and, particularly, to a turbocharger generating a vacuum negative pressure, a vacuum negative pressure supply type brake system using the same, and a control method thereof which may make it possible to generate a vacuum negative pressure under a braking condition while maintaining an intake turbo charging function and to supply the generated negative pressure to the side of a brake.

Description of Related Art

In general, a brake system for a vehicle requires a vacuum negative pressure so as to assist a driver's pedal operating force and is configured to operate while interlocking with a surge tank provided at an intake passage through which a vacuum booster is connected to an engine.

Therefore, in case of braking based on a brake pedal operation, a master cylinder operates by a vacuum booster operating force assisted with a vacuum negative pressure at the side of the surge tank, so that a required brake hydraulic pressure may be generated when braking a vehicle.

However, a surge tank method may be influenced by the flowing speed of external air inputted into an engine, for which a required vacuum negative pressure may not be sufficiently generated when braking, depending on an engine operation condition. In particular, the lack of such a vacuum negative pressure may be worsened in a high compression ratio gasoline engine to which a turbocharger is applied.

For this reason, a high compression ratio gasoline engine separately uses a vacuum pump together with a surge tank in order to generate a sufficient vacuum negative pressure required when braking, so it becomes possible to maintain a required braking performance of a brake system with the aid of the above-mentioned configuration.

However, since the vacuum pump is configured to operate when it needs to supplement as much as the lack of a vacuum negative pressure required when braking, there may be a risk to increase the price of a vehicle due to the higher price as compared with its use frequency.

In addition, the vacuum pump is connected in front of a transmission (T/M) to a vacuum booster using a plurality of long vacuum hoses, which may cause an additional price increasing risk, and the degree of freedom in terms of the design of an engine room and a vehicle layout may be lowered.

The above information disclosed in this Background section is only for enhancement of understanding of the background of the invention and therefore it may contain information that does not form the prior art that is already known in this country to a person of ordinary skill in the art.

BRIEF SUMMARY

Various aspects of the present invention are directed to providing a vacuum negative pressure supply type brake system which is characterized in that the function of a turbocharger may be enhanced since a vacuum negative pressure may be generated using a rotational force based on exhaust gas, and since a vacuum booster uses a vacuum generative pressure generated by the turbocharger, it is possible to prevent the decline of a prime cost-based competitiveness which has taken place because of the adoption of an additional vacuum pump and the use of vacuum hoses, and the degree of freedom in terms of the design of the engine room layout may be improved in such a way to remove the vacuum pump which has been installed in front of the transmission.

According to various aspects of the present invention, a turbocharger generating a vacuum negative pressure may include a compressor which receives, through a turbocharger shaft, a rotational force of a turbine which rotates based on exhaust gas from an engine and turbo-charges an intake which is supplied to the engine, and a motorless vacuum pump coupled to the turbine through a center housing which is coupled to the compressor and is configured to be rotated by the turbocharger shaft, thus generating a vacuum negative pressure.

The motorless vacuum pump may include a rotor which includes a plurality of vanes arranged in a radial shape and is rotated by the turbocharger shaft, and a rotor housing which includes an inside space for encasing the rotor so as to generate a vacuum negative pressure in a state where the rotor housing is fixed at the center housing and the turbine, respectively.

The motorless vacuum pump may further include a valve configured to open the inside space of the rotor housing so as to discharge the vacuum negative pressure.

The rotor housing may include a vacuum negative pressure inflow port which forms the inner space to have a vacuum negative pressure condition, and a vacuum negative pressure discharge port configured to discharge the vacuum negative pressure generated inside of the inside space, and the vacuum negative pressure discharge port may comprise the valve.

The rotor housing may include a vacuum negative pressure inflow port which forms the inner space to have a vacuum negative pressure condition, a vacuum negative pressure discharge port configured to discharge the vacuum negative pressure generated inside of the inside space, and an outlet nipple which is coupled to the vacuum negative pressure discharge port, and the outlet nipple may comprises the valve.

The valve may include a solenoid valve, an on/off condition of which is controlled in response to a supply of current.

According to various aspects of the present invention, a brake system using a turbocharger generating a vacuum negative pressure may include a vacuum booster configured to assist a brake pedal operating force with a vacuum negative pressure;

a master cylinder configured to generate a brake hydraulic pressure based on interlocking with the vacuum booster, a turbocharger including a motorless vacuum pump formed of a rotor having vanes rotating by a turbocharger shaft which interconnects a turbine rotating by exhaust gas from an engine, and a compressor turbo-charging an intake supplied to the engine, and a rotor housing generating a vacuum negative pressure in an inside space which encases the rotor, a vacuum negative pressure sensor which detects a vacuum negative pressure of the vacuum booster, a vacuum negative pressure inflow line connected to the vacuum booster so as to form an inner space of the rotor housing to have a vacuum negative pressure condition, a vacuum negative pressure supply line connected to the vacuum booster so as to supply a vacuum negative pressure generated in the inside space of the rotor housing to the vacuum booster, and an engine Electronic Control Unit (ECU) configured to read a vacuum negative pressure detection value of the vacuum negative pressure sensor and control the opening and closing of the valve installed at the vacuum negative pressure supply line.

The opening and closing control of the valve by the engine ECU may be performed based on a vacuum negative pressure of 250 mmHg.

According to various aspects of the present invention, a method for controlling a vacuum negative pressure supply type brake system using a turbocharger generating a vacuum negative pressure may include (A) recognizing a brake pedal operation by an ECU, and determining by the ECU whether or not a vacuum negative pressure value inside of a vacuum booster is lower than a predetermined set value, (B) when the vacuum negative pressure value is lower than the set value, opening, by the ECU, a valve provided at a motorless vacuum pump which is rotated by a turbocharger shaft between a turbine of the turbocharger and a compressor, thus generating a vacuum negative pressure, so the vacuum negative pressure is supplied to the vacuum booster wherein the vacuum negative pressure assists the brake pedal operating force, and (C) determining, by the ECU, whether or not the vacuum negative pressure increases by detecting the vacuum negative pressure inside of the vacuum booster, and when the detected vacuum negative pressure increases to higher than the set value, the valve is closed.

The set value of the vacuum negative pressure may be 250 mmHg.

The ECU may stop an air conditioner compressor, which is in operation, when there is not an increase in the vacuum negative pressure inside of the vacuum booster.

The ECU may determine again whether or not the vacuum negative pressure increases by detecting the vacuum negative pressure inside of the vacuum booster when the air conditioner compressor is not in operation when there is not any increase of the vacuum negative pressure inside of the vacuum booster.

The turbocharger of the present invention is advantageous in that the turbocharger function may be enhanced since the vacuum negative pressure is formed using the torque which generates by the exhaust gas which turbo-charges external air.

In addition, the brake system according to the present invention does not require any use of the vacuum pump for generating the vacuum negative pressure since the vacuum booster uses the vacuum negative pressure of the turbocharger formed by the torque based on the exhaust gas, thus improving the competitiveness of the vehicle thanks to the higher competitiveness in terms of the production cost since the vacuum pump is eliminated.

In addition, the brake system according to the present invention has effects in that the degree of freedom in terms of the layout of the engine room may be improved as compared to the vacuum pump located in front of the transmission (T/M), by connecting the vacuum line from the turbocharger to the vacuum booster.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2A, FIG. 2B and FIG. 2C are views illustrating a motorless vacuum pump according to the present invention.

FIG. 4 is a flowchart illustrating a vacuum negative pressure control of a brake system using the exemplary turbocharger generating the vacuum negative pressure according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
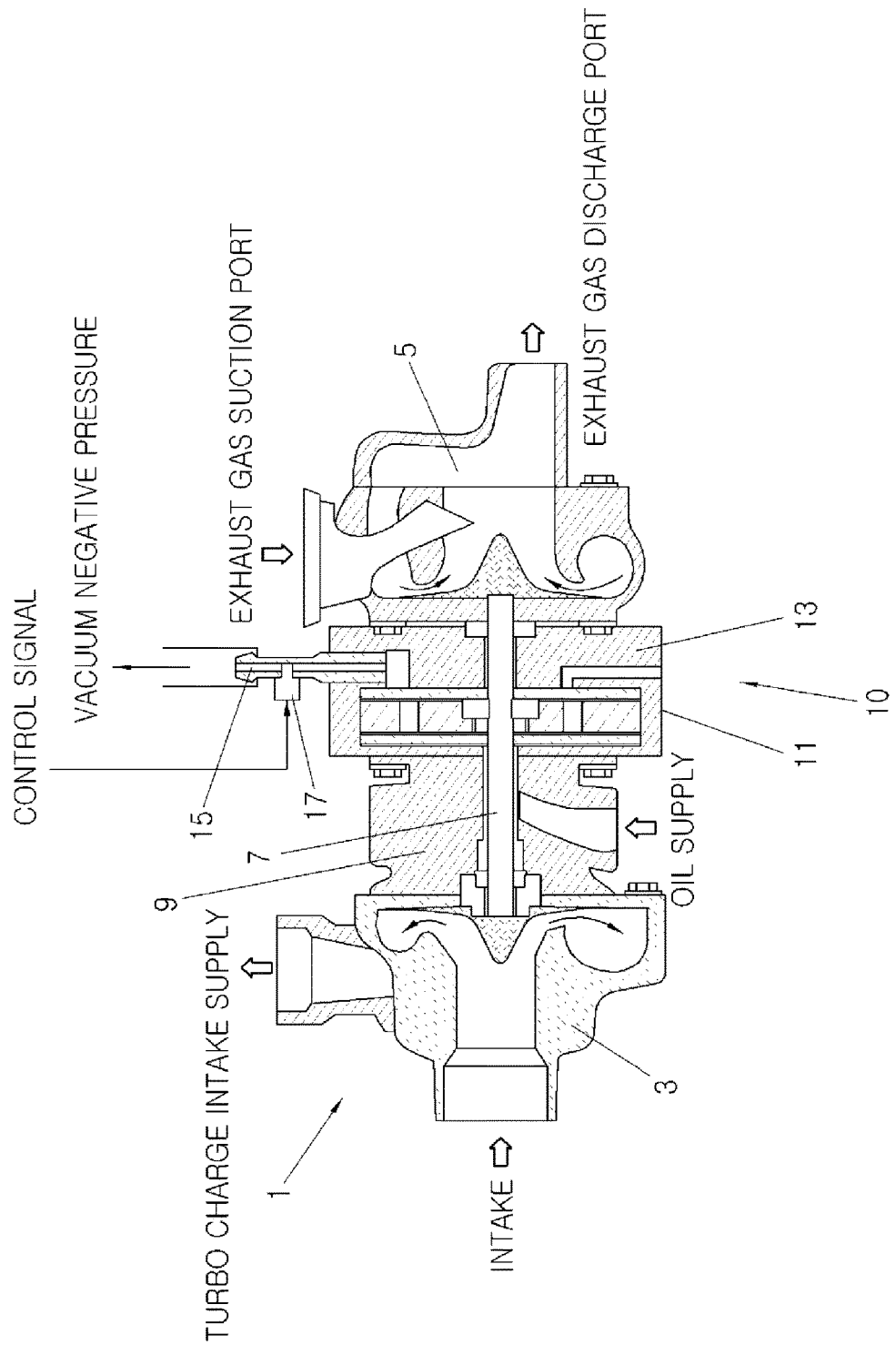
FIG. 1 is a view illustrating a configuration of an exemplary turbocharger generating a vacuum negative pressure according to the present invention.

FIG. 1 is a view illustrating a configuration of a turbocharger generating a vacuum negative pressure according to the present invention. As illustrated therein, the turbocharger 1 may include a compressor 3, a turbine 5, and a motorless vacuum pump 10 which is engaged to a turbocharger shaft 7 connecting the compressor 3 and the turbine 5.

More specifically, the turbocharger 1 is the same as the turbocharger used in a diesel engine or a Gasoline Direct Injection (GDI) engine. Therefore, the compressor 3 serves to receive the rotational force of the turbine 5 through a turbocharger shaft 7 and to compress the intake which is supplied into the engine. The turbine 5 serves to rotate the compressor 4 by transferring the rotational force based on the flow of exhaust gas to the turbocharger shaft 7. However, the turbocharger 1 has a little difference as compared with the configuration of a typical turbocharger shaft and a typical center housing in the way that the turbocharger 1 serves to integrate the compressor 3 and the turbine 5 and to couple the motorless vacuum pump 10. For an instance, an intermediate portion of the turbocharger shaft 7 is fixed at the motorless vacuum pump 10, and the center housing 9 is integrated at one side with the compressor 3, and the center housing 9 couples at the other side the motorless vacuum pump 10 which is coupled to the turbine 5.

Here, the motorless vacuum pump 10 may include a housing 13 which is configured to encase a rotor 11, vanes 11-1, a vacuum negative pressure inflow port 13-1, and a vacuum negative pressure discharge port 13-2.

FIG. 2A-FIG. 2C are views illustrating a detailed configuration of the motorless vacuum pump 10. As illustrated therein, the rotor 11 is coupled to the turbocharger shaft 7 of the turbocharger 1 and is rotated by the rotational force of the turbine 5 which is transferred to the compressor 3 and is eccentrically encased inside of a rotor housing 13. The vanes 11-1 maintain a contacting state with the inner surface of the rotor housing 13 in a state where the vanes 11-1 are engaged in a radial shape to the rotor 11, thus generating vacuum negative pressure by widening or narrowing the interval to the rotor housing 13 as the rotor 11 rotates. The rotor housing 13 is configured to eccentrically encase the rotor 11 and come into contact with each of the vanes 11-1, thus generating vacuum negative pressure inside of the rotor housing 13 based on the lengths of the vanes 11-1 which vary as the rotor 11 rotates. For this function, the rotor housing 13 may include a vacuum negative pressure inflow port 13-1 through which vacuum negative pressure is transferred, for thereby being blocked from atmosphere and may include a vacuum negative pressure discharge port 13-2, for thereby discharging the generated inside vacuum negative pressure in a state where the rotor housing 13 is blocked from atmosphere. In particular, an outlet nipple 15 may be connected to the vacuum negative pressure discharge port 13-2, and the outlet nipple 15 may include a valve 17 which is controlled by an engine Electronic Control Unit (ECU), for thereby opening and closing the passage of the outlet nipple 15. For an instance, the valve 17 includes a valve formed of a plunger and a piston, thus opening and closing the passage of the vacuum negative pressure discharge port 13-2 in a way of an on/off control based on the supply of current. Therefore the valve 17 may be a solenoid valve which is on/off controlled by the supply of current.

Figure 3A:
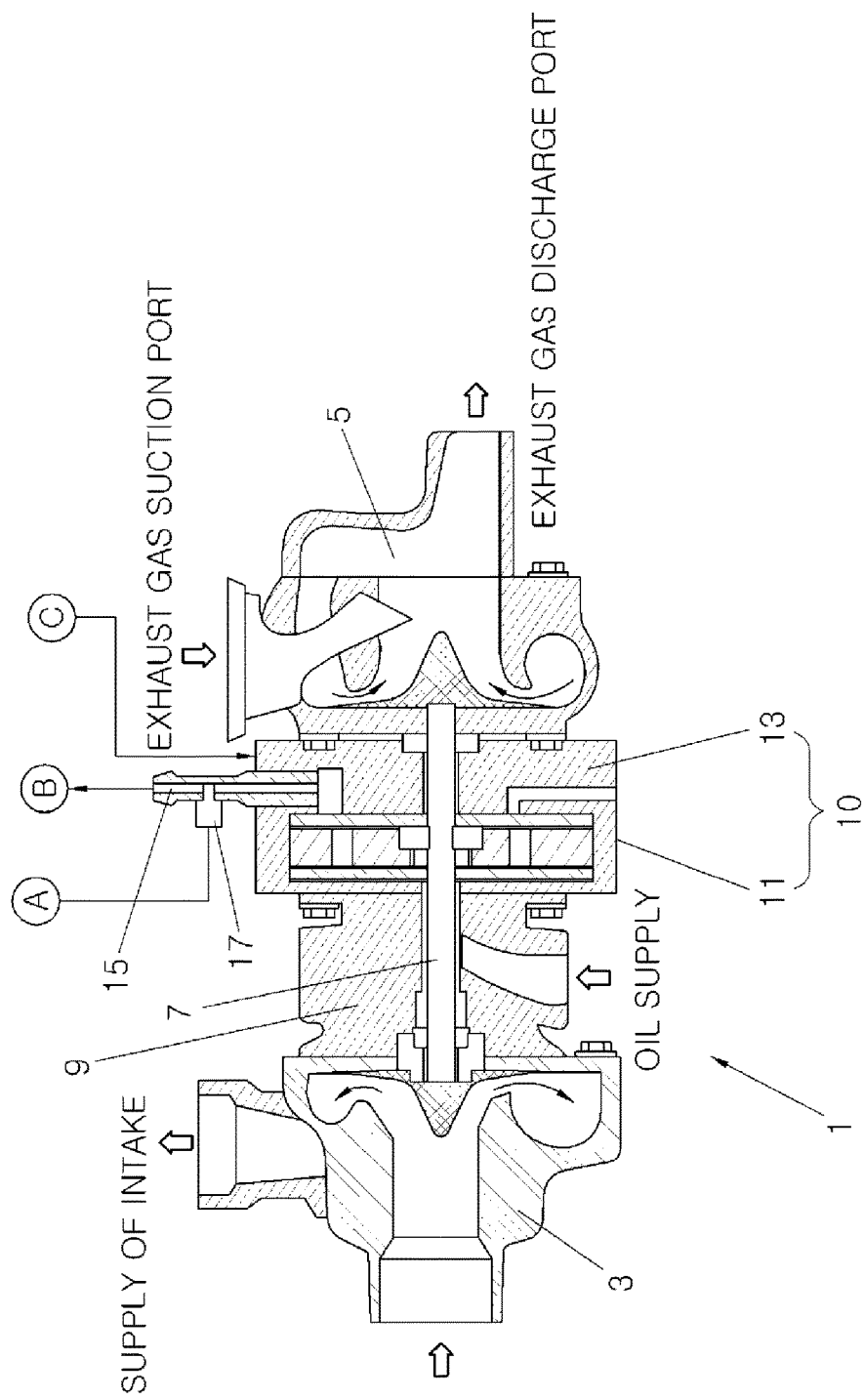
FIGS. 3A and 3B are views illustrating a configuration using the exemplary turbocharger generating the vacuum negative pressure according to the present invention.
Figure 3B:
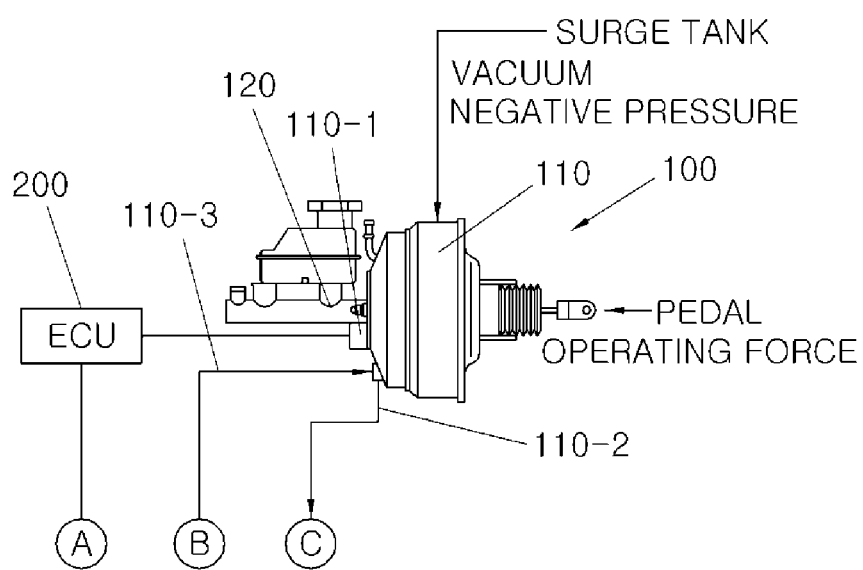

Meanwhile, FIGS. 3A and 3B are views illustrating a configuration of a brake system to which a turbocharger generating a vacuum negative pressure according to the present invention is applied.

As illustrated therein, the brake system 100 includes a vacuum booster 110, a master cylinder 120, a turbocharger 1 in which a motorless vacuum pump 10 is integrated, and an engine ECU 200.

More specifically, the vacuum booster 110 serves to transfer to the master cylinder 120 the brake penal operation force which is enhanced based on an interlocking operation between the vacuum negative pressure supplied from the surge tank or from the motorless vacuum pump 10 in case of the lack of the vacuum negative pressure depending on the engine driving condition. For this operation, the vacuum booster 110 may further include a vacuum negative pressure sensor 110-1 for measuring all the time the inside negative pressure of the vacuum booster 110, and a vacuum negative pressure line which is connected to the motorless vacuum pump 10. The vacuum negative pressure line is formed of a vacuum negative pressure inflow line 110-2, and a vacuum negative pressure supply line 110-3, and the vacuum negative pressure inflow line 110-2 is connected from the vacuum booster 110 to the vacuum negative pressure inflow port 13-1 formed at the rotor housing 13 of the motorless vacuum pump 10, and the vacuum negative pressure supply line 110-3 is connected from the vacuum booster 110 to a vacuum negative pressure discharge port 13-2 formed at the rotor housing 13 of the motorless vacuum pump 10.

More specifically, a brake line connected to wheels is connected to the master cylinder 120, and the master cylinder 120 serves to form a brake hydraulic pressure based on the brake pedal operation transferred from the vacuum booster 110 and may include an oil reservoir.

More specifically, the engine ECU 200 is configured to control the vacuum negative pressure supplied from the vacuum negative pressure discharge port 13-2 to the vacuum booster 110 in such a way to control the engine, read the detection value of the vacuum negative pressure sensor 110-1 provided at the vacuum booster 110, and on/off control the valve 17 provided at the outlet nipple 15 of the motorless vacuum pump 10. For an instance, if the detection value of the vacuum negative pressure sensor 110-1 is lower than about 250 mmHg, such an operation condition may be determined as meaning that an engine operation lacks the vacuum negative pressure in the surge tank, so that the vacuum negative pressure generated in the motorless vacuum pump 10 may be supplied into the vacuum booster 110 by opening the valve 17. At this time, since the value of 250 mmHg may vary depending on the kinds of vehicles, such a value may not be used as a specified value which may be applied to all kinds of the vehicles.

More specifically, the motorless vacuum pump 10 is the same as the motorless vacuum pump 1 as illustrated in FIG. 1 and FIG. 2A-FIG. 2C, provided that there are differences in the way that the vacuum negative pressure inflow port 13-1 of the rotor housing 13 is connected through the vacuum negative pressure inflow line 110-2 to the vacuum booster 110, and the outlet nipple 15 provided at the vacuum negative pressure discharge port 13-2 of the rotor housing 13 is connected through the vacuum negative pressure supply line 110-3 to the vacuum booster 110.

Figure 5A:
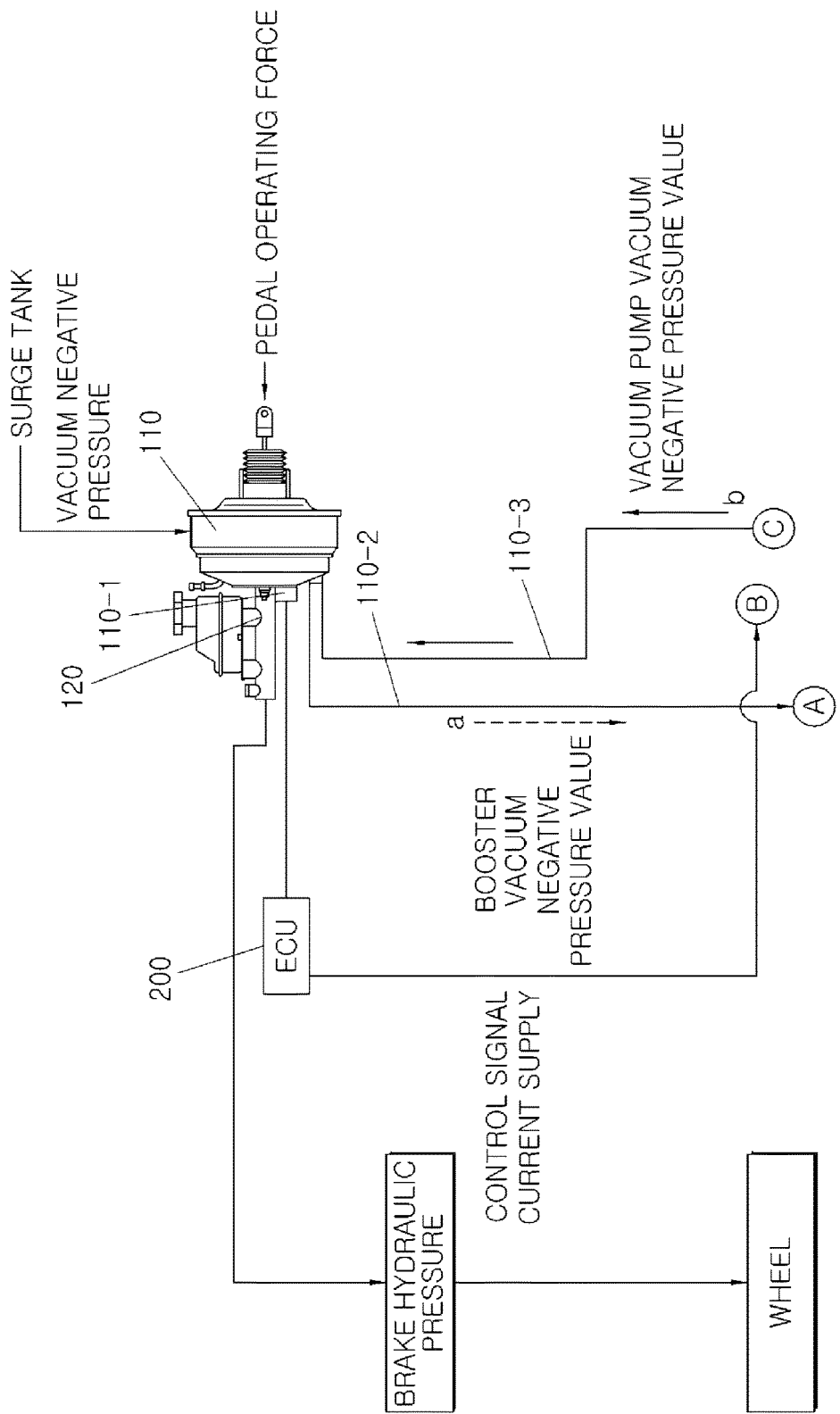
FIGS. 5A and 5B are views illustrating an operation state of the motorless vacuum pump of FIG. 4.
Figure 5B:
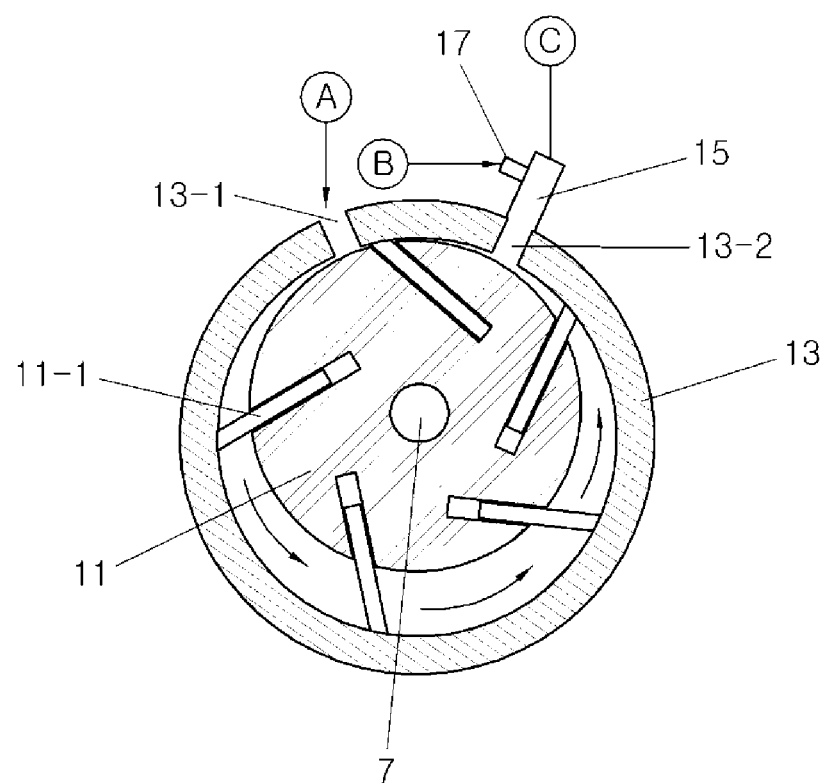

Meanwhile, FIG. 4 is a view illustrating an example of the vacuum negative pressure control method of the brake system 100 using the vacuum negative pressure generation turbocharger 1 according to the present invention, and FIGS. 5A and 5B are views illustrating an operation state of the motorless vacuum pump 10 based on the vacuum negative pressure control method in FIG. 4. The operations of the brake system 100 will be described based on the example where the engine operation lacks the vacuum negative pressure which is supplied from the surge tank to the vacuum booster 110.

In the Step S10, the engine ECU 200 determines whether or not the inside vacuum negative pressure of the vacuum booster 110 is enough in case of the brake pedal operation. For this operation, the engine ECU 200 reads the detection value of the vacuum negative pressure sensor 110-1 and determines whether or not the read detection value is lower than about 250 mmHg. At this time, since the value of 250 mmHg varies depending on the kinds of the vehicles, such a value represents a predetermined example value which is not specified for all kinds of vehicles.

In the Step S10, if the value is determined as being higher than 250 mmHg, it means that the vacuum negative pressure required by the vacuum booster 110 is high enough, so the engine ECU 200 does not output a control signal to the valve 17, and the motorless vacuum pump 10 does not supply the vacuum negative pressure generated based on the operation of the turbocharger 1 to the vacuum booster 110.

Meanwhile, in the Step S10, if the value is determined as being lower than 250 mmHg, since it means that the vacuum negative pressure required by the vacuum booster 110 is not high enough, the routine goes to the Step S20, and since the engine ECU 200 outputs a control signal, the valve 17 is activated, and the operation of the valve 17 contributes to the opening of the passage of the outlet nipple 15 provided at the vacuum negative pressure discharge port 13-2 of the rotor housing 13. As a result, the vacuum negative pressure generated by the motorless vacuum pump 10 is supplied through the vacuum negative pressure supply line 110-3 to the vacuum booster 110. At this time, the motorless vacuum pump 10 creates a vacuum condition with the booster vacuum negative pressure value, and supplies the vacuum pump vacuum negative pressure value 'b' to the vacuum booster 110.

In the Step S30, if the vacuum negative pressure of the vacuum booster 110 increases, it is determined whether or not the increased value of the vacuum negative pressure is higher than 250 mmHg in the Step S40, and if the value is higher than 250 mmHg in the Step S50, the supply of the vacuum negative pressure by the motorless vacuum pump 10 is stopped. For this operation, the engine ECU 200 determines whether or not the detection value of the vacuum negative pressure sensor 110-1 is higher than 250 mmHg, and at the value which is higher than 250 mmHg, the control signal which is outputted to the valve 17 is stopped.

However, if the vacuum negative pressure of the vacuum booster 110 determined in the Step S30 does not increase, the engine ECU 200 checks the operation state of the air conditioner compressor (A/C compressor) as in the Step S30-1, and in case of the non-operation, the routine goes back to the Step S30, and in case of the operation, the air conditioner compressor is cut off (A/C cut off) based on an air conditioner control logic as in the Step S30-2, and the routines goes to the Step S40. In this way, the engine ECU 200 may control the air conditioned in order for the vacuum negative pressure required by the vacuum booster 110 to be fast supplied, when controlling the brake system 100.

As described above, since the vacuum negative pressure supply type brake system according to the present invention may include the turbocharger 1 which is formed of the compressor 3 configured to turbo-charge the intake supplied to the engine by receiving the rotational force of the turbine 6, which rotates based on exhaust gas from the engine, through the turbocharger shaft 7, and the motorless vacuum pump 1 which is coupled to the turbine 5 through the center housing 9 coupled to the compressor 3 and creates vacuum negative pressure based on the rotations by the turbocharger shaft 7, the vacuum negative pressure which used to be supplied to the additional vacuum pump may be supplied to the turbocharger 1, and in particular, and the decline of the prime cost competitiveness, which has took place because of the adoption of the additional vacuum pump and the use of the vacuum hoses, may be prevented, and the degree of freedom in terms of the engine room layout may be improved thanks to the deletion of the additional vacuum pump which is installed in front of the transmission.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A turbocharger generating a vacuum negative pressure, comprising:
    a compressor which receives, through a turbocharger shaft, a rotational force of a turbine which rotates based on exhaust gas from an engine and turbo-charges an intake which is supplied to the engine; and
    a motorless vacuum pump which is engaged to the turbocharger shaft connecting the compressor and the turbine, thus generating the vacuum negative pressure,
    wherein the motorless vacuum pump comprises:
        a rotor which includes a plurality of vanes arranged in a radial direction and is rotated by the turbocharger shaft; and
        a rotor housing which includes an inside space for encasing the rotor to generate the vacuum negative pressure and is located at the center housing and the turbine,
        a valve configured to open the inside space of the rotor housing to discharge the vacuum negative pressure, and
    wherein the rotor housing comprises:
        a vacuum negative pressure inflow port which forms the inside space to have a vacuum negative pressure condition; and
        a vacuum negative pressure discharge port configured to discharge the vacuum negative pressure generated inside of the inside space, the vacuum negative pressure discharge port including the valve.

2. The turbocharger of claim 1, wherein the rotor housing further comprises:
    an outlet nipple which is coupled to the vacuum negative pressure discharge port, the outlet nipple including the valve.

3. The turbocharger of claim 1, wherein the valve comprises a solenoid valve, an on/off condition of which is controlled in response to a supply of current.

* * * * *